United States Patent [19]

Kotera et al.

[11] 4,307,320
[45] Dec. 22, 1981

[54] PIGMENT COATED PHOSPHOR AND HIGH CONTRAST COLOR TELEVISION CATHODE RAY TUBE USING SAME

[75] Inventors: Noboru Kotera; Thihiro Yoshida, both of Hatano; Toshiaki Hatsumi; Kazuhito Iwasaki, both of Odawara; Isao Iwamoto, Hiratsuka; Katuzo Kanda, Oiso; Seiji Murakami; Shusaku Eguchi, both of Minami ashigara, all of Japan

[73] Assignee: Kasei Optonix, Ltd., Tokyo, Japan

[21] Appl. No.: 50,064

[22] Filed: Jun. 19, 1979

Related U.S. Application Data

[63] Continuation of Ser. No. 874,829, Feb. 3, 1978, abandoned.

[51] Int. Cl.³ .............................................. H01J 29/10
[52] U.S. Cl. ............................. 313/474; 252/301.45; 427/64; 427/68
[58] Field of Search ................... 252/301.45; 427/68, 427/64; 313/474, 473

[56] References Cited

U.S. PATENT DOCUMENTS

| | | | |
|---|---|---|---|
| 3,875,449 | 4/1975 | Byler | 313/466 |
| 3,886,394 | 5/1975 | Lipp | 427/68 |
| 4,021,588 | 5/1977 | Royce | 427/215 |
| 4,049,845 | 9/1977 | Lozler | 427/68 |
| 4,152,483 | 5/1979 | Kanda | 427/68 |

*Primary Examiner*—Sam Silverberg

[57] ABSTRACT

Pigment coated phosphors comprising a europium activated yttrium oxysulfide phosphor having a europium activator value within a range of 0.04 gram atom to 0.066 gram atom per 1 mol of yttrium oxysulfide having adhered thereto red colored pigment particles such as cadmium sulfoselenide pigment particles, rouge pigment particles or red lead pigment particles, in respective amounts of 0.1 to 2.0 wt %, 0.05 to 2.0 wt % or 0.1 to 12 wt %, based upon the europium activated yttrium oxysulfide phosphor; and a cathode ray tube for high contrast color television using as a red emitting phosphor at least one of the three pigment coated phosphors.

17 Claims, 22 Drawing Figures

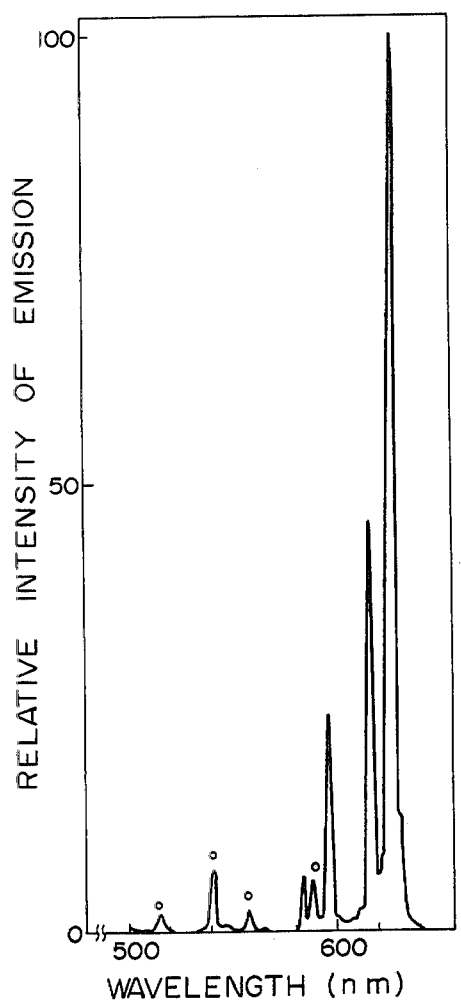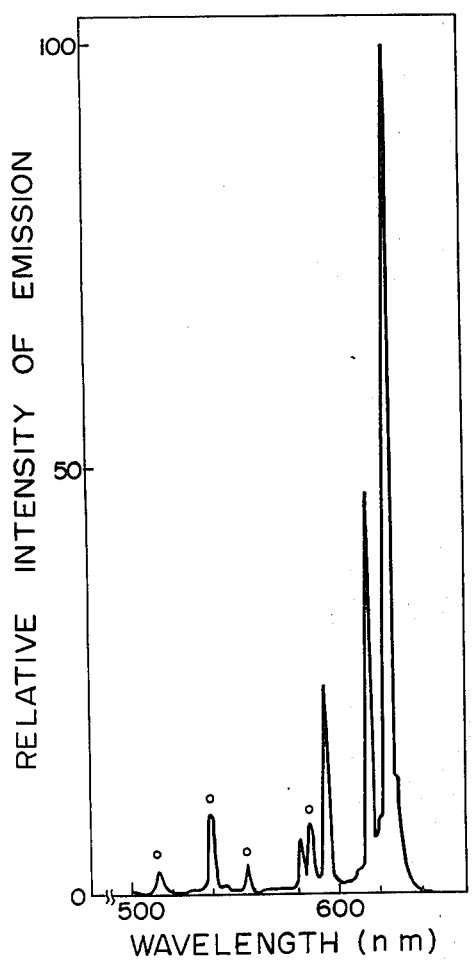

FIG. IE

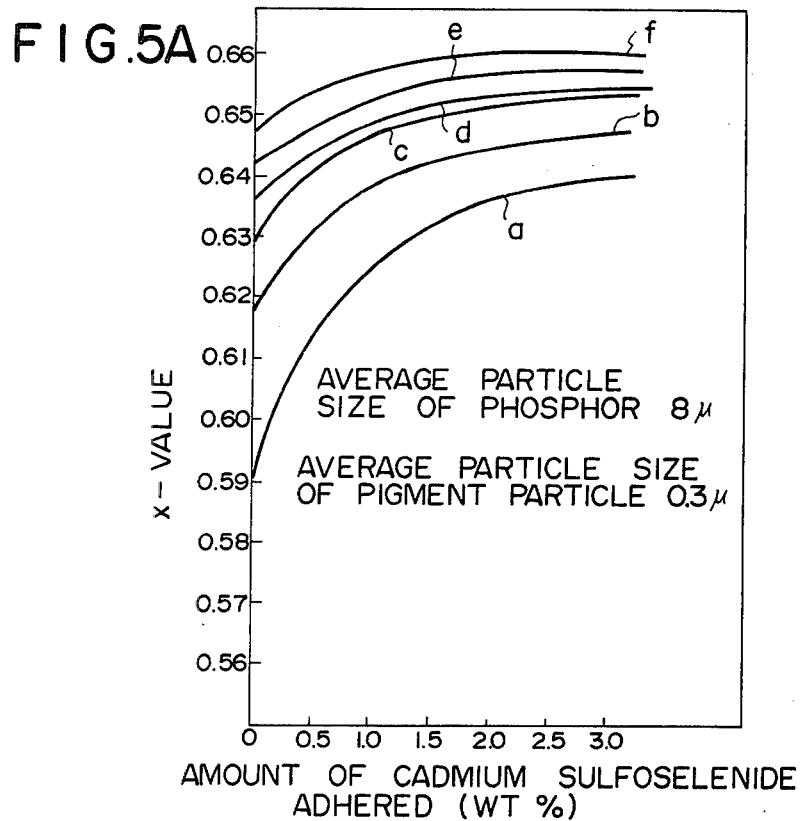
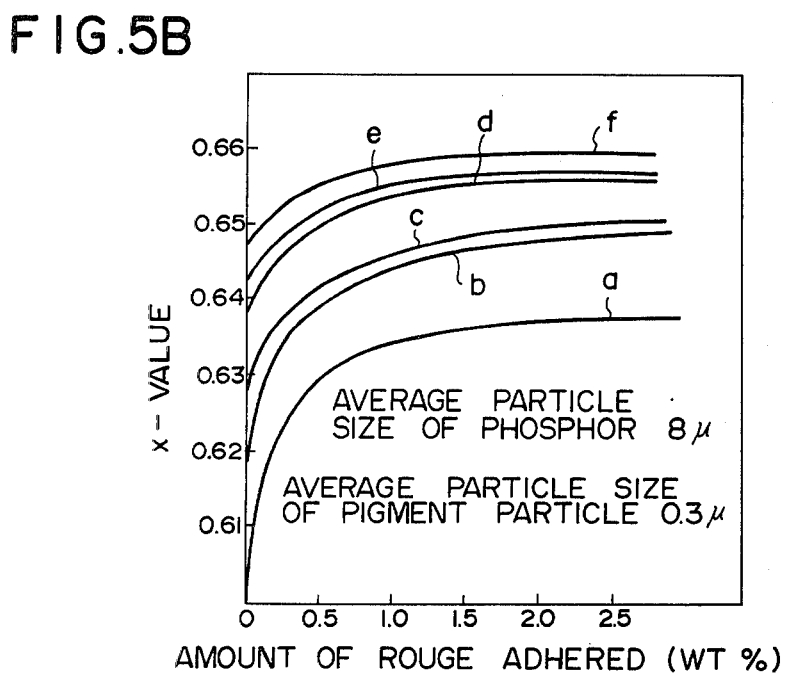

PIGMENT COATED PHOSPHOR AND HIGH CONTRAST COLOR TELEVISION CATHODE RAY TUBE USING SAME

This is a continuation, of application Ser. No. 874,829, filed Feb. 3, 1978 now abandoned.

BACKGROUND OF THE INVENTION

1. Field of the Invention

The present invention relates to a phosphor having a coating made of pigment particles (hereinafter referred to as "pigment coated phosphor") and to a high contrast color television cathode ray tube using the pigment coated phosphor. More particularly, the present invention relates to a red pigment coated red emitting phosphor and to a high contrast color television cathode ray tube using the red pigment coated red emitting phosphor. 2. Description of the Prior Art Heretofore europium activated yttrium oxysulfide (hereinafter often referred to as "$Y_2O_2S:Eu$") phosphors have been employed as red emitting phosphor particles in cathode ray tubes for color television. The $Y_2O_2S:Eu$ phosphors vary in emission color and luminance depending upon the amount of the europium used as an activator (thereinafter simply referred to as "Eu activator value") as will be discussed hereinbelow. However, upon use of the phosphor as a red emitting phosphor in a cathode ray tube for color television, it is required from the viewpoint of the various characteristics desirable of cathode ray tubes, such as color reproduction, white luminance, red emitting color point, red emission luminance, and the like, that the phosphor possesses color points for emission in or in close proximity to a color area surrounded by color points A ($x=0.643$, $y=0.357$), B ($x=0.643$, $y=0.343$), C ($x=0.652$, $y=0.340$) and D ($x=0.652$, $y=0.348$) in the Standard Chromaticity Diagram Sytem CIE as is shown in FIG. 8 below. Thus, there has been provided for practical use as a red emitting phosphor for color television cathode ray tubes a $Y_2O_2S:Eu$ phosphor having its color point within the red area described above wherein the Eu activator value is in the range of 0.067 to 0.08 gram atom per 1 mol of $Y_2O_2S$.

As is well known in the art, adherence of pigment particles of the corresponding color to at least one of the respective surfaces of the blue phosphor particles, green phosphor particles and red phosphor particles employed in a cathode ray tube for color television markedly enhances the contrast of the image formed on the cathode ray tube, since a part of the visible region of the emitted spectra is cut due to the filter effect of these pigment particles adhering thereto, resulting in a clearer emission color and further, absorption of incident external light is enhanced by the pigment coloration of the luminescent screen so as to reduce the reflection of light therefrom (U.S. Pat. No. 3,886,394).

It is required for the pigment coated phosphor employed in a cathode ray tube for high contrast color television mentioned above that reflectance be low and emission luminance be sufficiently high. That is, for a given reflectance, the emission luminance is desirably as high as possible.

SUMMARY OF THE INVENTION

One object of the present invention is to provide a red pigment coated red emitting phosphor which is suitable for use in a high contrast color television cathode ray tube having low reflectance to external light, sufficiently high emission luminance and high practical utility, which pigment coated phosphor comprises a $Y_2O_2S:Eu$ phosphor as a red emitting phosphor and, at least one member selected from the group consisting of cadmium sulfoselenide, rouge and red lead as red colored pigment particles.

A further object of the present invention is to provide a pigment coated phosphor of good emission color which is highly practical for use in a high contrast color television cathode ray tube.

A further object of the present invention is to provide a pigment coated phosphor for a high contrast color television cathode ray tube at reduced cost.

A further object of the present invention is to provide a high contrast color television cathode ray tube exhibiting sufficiently high white luminance, using the aforementioned pigment coated phosphor of the present invention as a red emitting phosphor.

The emission color and emission luminance of $Y_2O_2S:Eu$ phosphor varies depending upon the Eu activator value. In addition, according to the experiments performed by the present inventors, it has been found that when cadmium sulfoselenide pigment particles, rouge pigment particles or red lead pigment particles are adhered to the $Y_2O_2S:Eu$ phosphor, the emission color point of the pigment coated phosphor obtained is further to the longer wavelength side then that of the $Y_2O_2S:Eu$ phosphor. Based upon the above two findings, the present inventors have made various investigations on the Eu activator value of the $Y_2O_2S:Eu$ phosphor and the amounts of cadmium sulfoselenide, rouge or red lead to be adhered to the $Y_2O_2S:Eu$ phosphor in order to attain the above objects. As a result, it has been found that these objects can be achieved when cadmium sulfoselenide is adhered to the $Y_2O_2S:Eu$ phosphor in an amount of 0.1 to 2.0 wt %, when rouge is adhered thereto in an amount of 0.05 to 2.0 wt %, or when red lead is adhered thereto in an amount of 0.1 to 12 wt %, based on a $Y_2O_2S:Eu$ phosphor in which the Eu activator value is in a range of 0.04 to 0.066 gram atom per 1 mol of $Y_2O_2S$. $Y_2O_2S:Eu$ phosphor having an Eu activator value in this range are inexpensive due to the reduced activator value of Eu but have not heretofore been practical for use in color television cathode ray tubes because the emission color is too far to the shorter wavelength side.

The pigment coated phosphor in accordance with one embodiment of the present invention comprises a $Y_2O_2S:Eu$ phosphor having an Eu activator value in a range of 0.04 to 0.066 gram atom per 1 mol of $Y_2O_2S$ and having cadmium sulfoselenide pigment particles adhered to the surface thereof, which is characterized in that the amount of the cadmium sulfoselenide pigment particles adhered is in a range of 0.1 to 2.0 wt % based on the $Y_2O_2S:Eu$ phosphor.

The pigment coated phosphor in accordance with another embodiment of the present invention comprises a $Y_2O_2S:Eu$ phosphor having an Eu activator value in a range of from 0.04 to 0.066 gram atom per 1 mol of $Y_2O_2S$ and having red lead pigment particles adhered to the surface thereof, which is characterized in that the amount of the red lead pigment particles adhered is in a range of 0.05 to 2.0 wt % based on the $Y_2O_2S:Eu$ phosphor.

The pigment coated phosphor in accordance with a further embodiment of the present invention comprises a $Y_2O_2S:Eu$ phosphor having an Eu activator value in a range of 0.04 to 0.066 gram atom per 1 mol of $Y_2O_2S$ and having red lead pigment particles adhered to the surface thereof, characterized in that the amount of the red lead pigment particles adhered is in a range of 0.1 to 12 wt % based on the $Y_2O_2S$:Eu phosphor.

In addition, the high contrast color television cathode ray tube in accordance with the present invention is characterized in that at least one of the aforementioned three pigment coated phosphors is employed as the red emitting phosphor.

DETAILED DESCRIPTION OF THE INVENTION

Figure 1C:
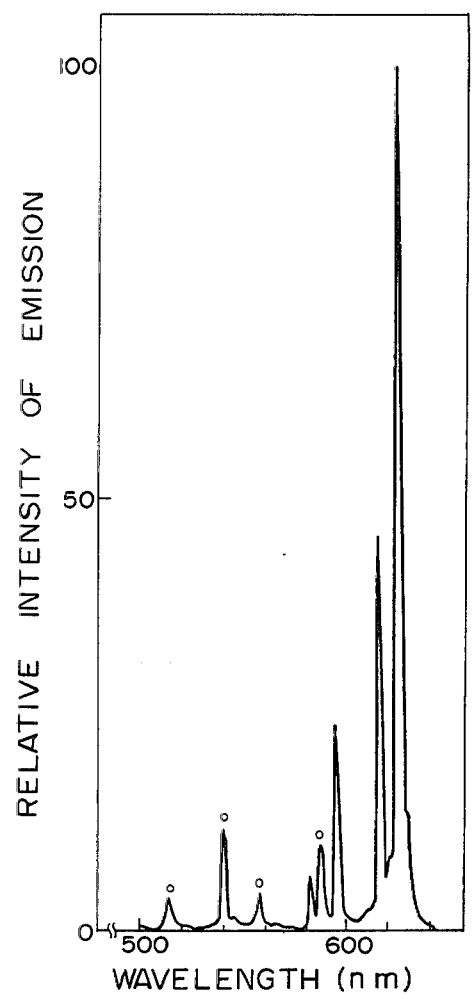
FIG. 1 represents the emission spectrum of $Y_2O_2S$:Eu phosphor wherein (A), (B), (C), (D) and (E) represent the cases wherein the Eu activator values are 0.08 gram atom, 0.07 gram atom, 0.06 gram atom, 0.05 gram atom and 0.04 gram atom, respectively.
Figure 1D:
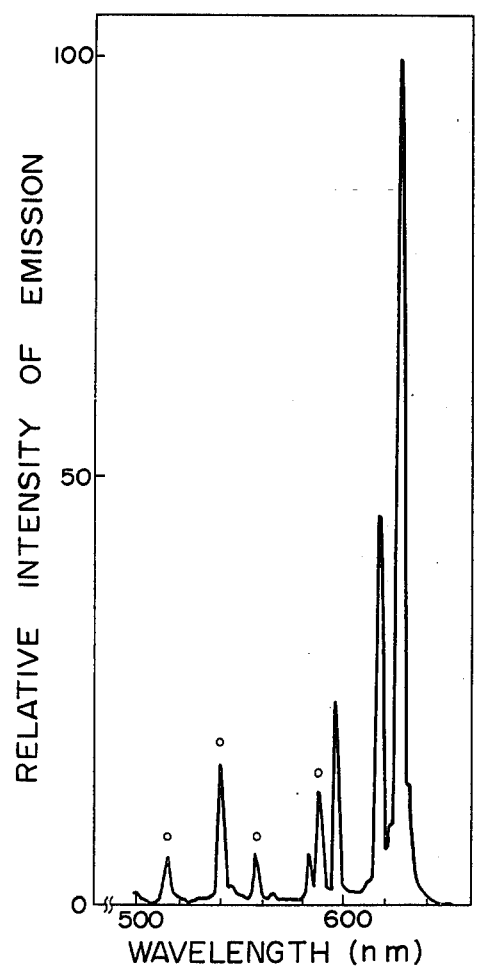

The emission color and emission luminance of the $Y_2O_2S$:Eu phosphor vary depending upon changes in Eu activator value. FIG. 1 represents the emission spectra of the $Y_2O_2S$:Eu phosphors wherein FIGS. 1-(A), (B), (C), (D) and (E) represent emission spectra of the $Y_2O_2S$:Eu phosphors having Eu activator values of 0.08 gram atom, 0.07 gram atom, 0.06 gram atom, 0.05 gram atom and 0.04 gram atom, respectively, per 1 mol of $Y_2O_2S$; in each of the emission spectra, the emission strength on the ordinate being shown by relative values when the peak strength of emission at 626 nm is defined as 100. The major emission peak strengths are read from the emission spectra shown in FIG. 1, which is summarized in Table 1 below.

TABLE 1

| Emission Peak (nm) | Eu Activator Value (gram atom/mol) | | | | |
|---|---|---|---|---|---|
| | 0.080 | 0.070 | 0.060 | 0.050 | 0.040 |
| 626 | 100 | 100 | 100 | 100 | 100 |
| 616 | 46.4 | 46.2 | 46.1 | 45.9 | 46.1 |
| 594 | 24.2 | 24.3 | 23.8 | 24.3 | 24.0 |
| 586 | 6.3 | 8.1 | 9.8 | 14.0 | 17.4 |
| 582 | 6.4 | 6.5 | 6.2 | 6.7 | 6.4 |
| 555 | 2.3 | 3.4 | 3.9 | 5.8 | 7.1 |
| 539 | 7.1 | 9.6 | 11.5 | 16.5 | 21.5 |
| 513 | 2.1 | 2.8 | 3.6 | 5.8 | 8.3 |

Figure 2:
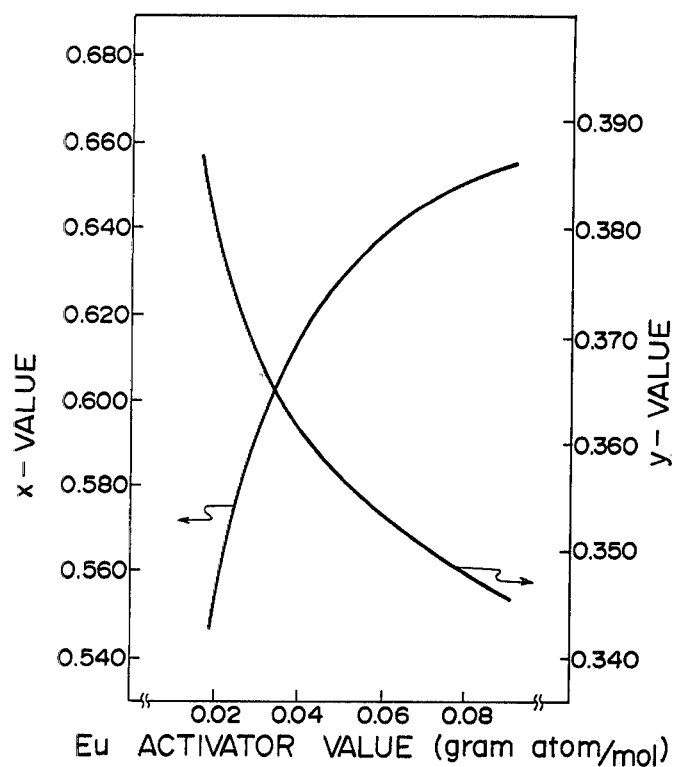
FIG. 2 represents a graph showing the relationship between the Eu activator value and the x value as well as the y value of the color point in the Standard Chromaticity Diagram System CIE.

As can be seen from Table 1 above, with the $Y_2O_2S$:Eu phosphor there is a tendency for the 586 nm, 555 nm, 539 nm and 513 nm emission peak strengths (the symbol "o" in FIG. 1) to increase relative to the emission peak strength at 626 nm as the Eu activator value decreases. That is, the emission color of the $Y_2O_2S$:Eu phosphor is gradually shifted to the shorter wavelength side as the Eu activator value is decreased. This will be clearer from FIG. 2. FIG. 2 is a graph showing the relationship between the Eu activator value in the $Y_2O_2S$:Eu phosphor and the x values as well as the y values of the color points in the Standard Chromaticity Diagram System CIE. As is clear from FIG. 2, in the $Y_2O_2S$:Eu phosphor, the x value decreases whereas the y value increases if the Eu activator value is reduced. That is, if the Eu activator value decreases, the emission color points are shifted to the shorter wavelength side.

Figure 3:
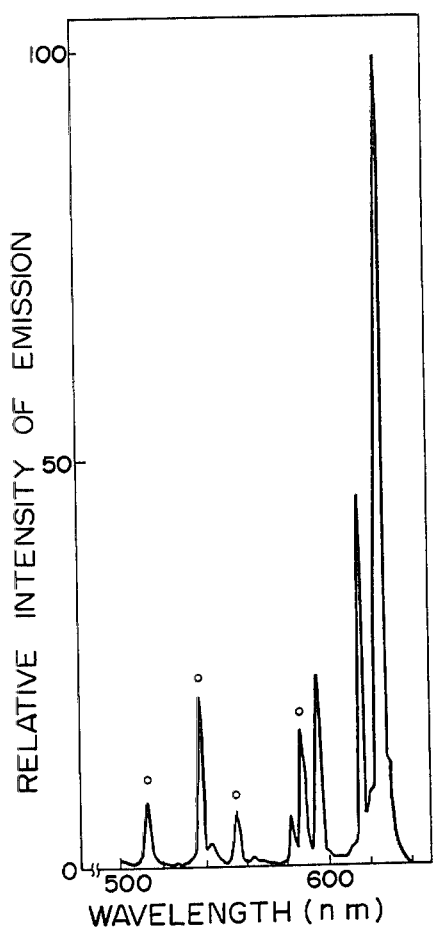
FIG. 3 represents a graph showing the relationship between the Eu activator value and the emission luminanace of the $Y_2O_2S$:Eu phosphor.
Figure 3:
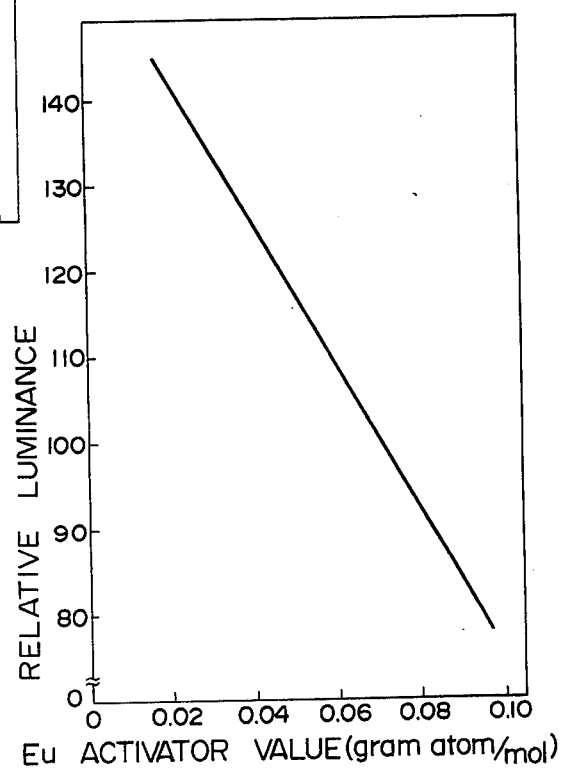

Referring next to the relationship between the Eu activator value in the $Y_2O_2S$:Eu phosphor and the emission luminance, the emission luminance is found to increase as the Eu activator value decreases. FIG. 3 is a graph showing the relationship between the Eu activator value in the $Y_2O_2S$:Eu phosphor and the emission luminance wherein the emission luminance on the ordinate is expressed as a relative value with respect to the emission luminance of a $Y_2O_2S$:Eu phosphor having an Eu activator value of 0.07 gram atoms per 1 mol of $Y_2O_2S$, the emission luminance of this latter phosphor being defined as 100. As is clear from FIG. 3, the emission luminance increases as the Eu activator value decreases. As stated above, this is because if the Eu activator value decreases, the emission peak strengths at 586 nm, 555 nm, 539 nm and 513 nm increase relative to the emission peak strength at 626 nm, and the emission luminance continuously increases until the Eu activator value drops so low that the absolute strength of the respective emission peaks decreases remarkably.

As stated above, in the $Y_2O_2S:Eu$ phosphor, the emission color is gradually shifted to the shorter wavelength side and the emission luminance thereof gradually increases as the Eu activator value decreases. Conversely, increase of the Eu activator value causes the emission color to gradually shift to the longer wavelength side and the emission luminance to gradually decrease. As stated previously, in a cathode ray tube for color television using $Y_2O_2S:Eu$ phosphor as the red emitting phosphor, it is required in view of the various characteristics desirable in a cathode ray tube that the $Y_2O_2S:Eu$ phosphor possess color points for emission at or in near proximity to a red area surrounded by color points A ($x=0.643$, $y=0.357$), B ($x=0.643$, $y=0.343$), C ($x=0.652$, $y=0.340$) and D ($x=0.652$, $y=0.348$) in the Standard Chromaticity Diagram System CIE. Thus, $Y_2O_2S:Eu$ phosphors having emission color points in the above-mentioned red area wherein the Eu activator value is in a range of from 0.067 gram atom to 0.08 gram atom per 1 mol of $Y_2O_2S$ have been provided for practical use.

As cadmium sulfoselenide pigment particles for use in the pigment coated phosphor of the present invention, there can be employed commercially available products. Cadmium sulfoselenide pigment particles vary in base (body) color depending upon this selenium content, method for production, particle size, and the like. The cadmium sulfoselenide pigment particles employed in the pigment coated phosphor of the present invention have reflectances at 600 nm, 650 nm and 700 nm which fall within the ranges indicated in Table 2 below wherein the values indicated are with respect to the reflectance of a magnesium oxide diffusion plate taken as 100%. At wavelengths shorter than 570 nm, the particles have a very small reflectance of no more than 10%.

TABLE 2

| Wavelength (nm) | 600 | 650 | 700 |
|---|---|---|---|
| Reflectance (%) | below 50 | 55–85 | 60–90 |

As rouge pigment particles used in the pigment coated phosphor of the present invention, there are also employed commercially available products. According to JIS Standard K 5109-1972, rouge pigments are classified into three grades: Special (more than 98.5% in ferric oxide content), No. 1 (more than 96% in ferric oxide content) and No. 2 (more than 80% in ferric oxide content). Any of these rouge pigments may be employed in the pigment coated phosphor in accordance with the present invention. Rouge pigment particles vary in base color depending upon method for production, particle size, ferric oxide content, and the like. The rouge pigment particles employed in the pigment coated phosphor of the present invention have reflectances at 550 nm, 600 nm, 650 nm and 700 nm falling within the ranges indicated in Table 3 below wherein the values indicated are with respect to the reflectance of a magnesium oxide diffusion plate taken as 100%. At wavelengths shorter than 550 nm, the particles have a very small reflectance of no more than 10%.

TABLE 3

| Wavelength (nm) | 550 | 600 | 650 | 700 |
|---|---|---|---|---|
| Reflectance (%) | 5–15 | 10–30 | 13–40 | 18–50 |

As red lead pigment particles employed in the pigment coated phosphor of the present invention, there are used commercially available products. According to JIS Standard K 5108-1965, red lead pigment particles are classified into four grades: Special (more than 97.0% of trilead tetroxide content), No. 1 (more than 96.0% trilead tetroxide content), No. 2 (more than 93.0% trilead tetroxide content) and No. 3 (more than 80% trilead tetroxide content) depending upon the trilead tetroxide content. In the present invention red lead having any content of trilead tetroxide can be employed in the pigment coated phosphor. While red lead pigment particles vary in base color depending upon the method used for production thereof, particle size, trilead tetroxide content, and the like, the red lead pigment particles employed in the pigment coated phosphor of the present invention have reflectances at 500 nm, 550 nm, 600 nm, 650 nm and 700 nm falling within the ranges indicated in Table 4 below wherein the values shown are with respect to the reflectance of a magnesium oxide diffusion plate taken as 100%. At wavelengths shorter than 500 nm, the particles have a very small reflectance of not more than 10%.

TABLE 4

| Wavelength (nm) | 500 | 550 | 600 | 650 | 700 |
|---|---|---|---|---|---|
| Reflectance (%) | 5–10 | 10–15 | 55–75 | 70–90 | 75–95 |

Figure 4A:
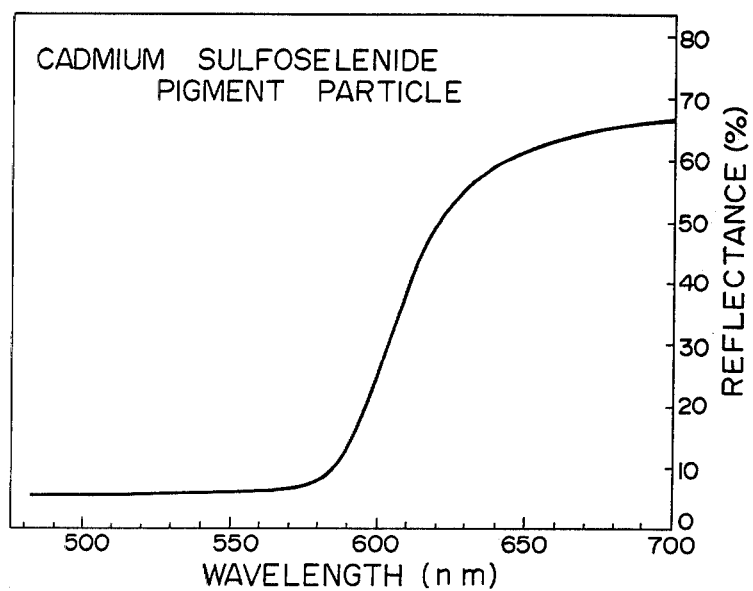
FIG. 4 represents the reflection spectra of the red pigment particles employed in the pigment coated phosphors in accordance with the present invention wherein (A), (B) and (C) represent cadmium sulfoselenide pigment particles, rouge pigment particles and red lead pigment particles, respectively.
Figure 4B:
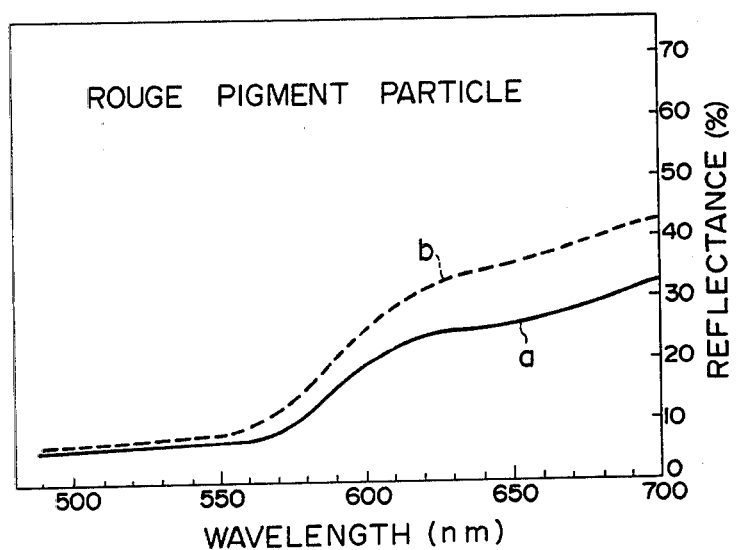
Figure 4C:
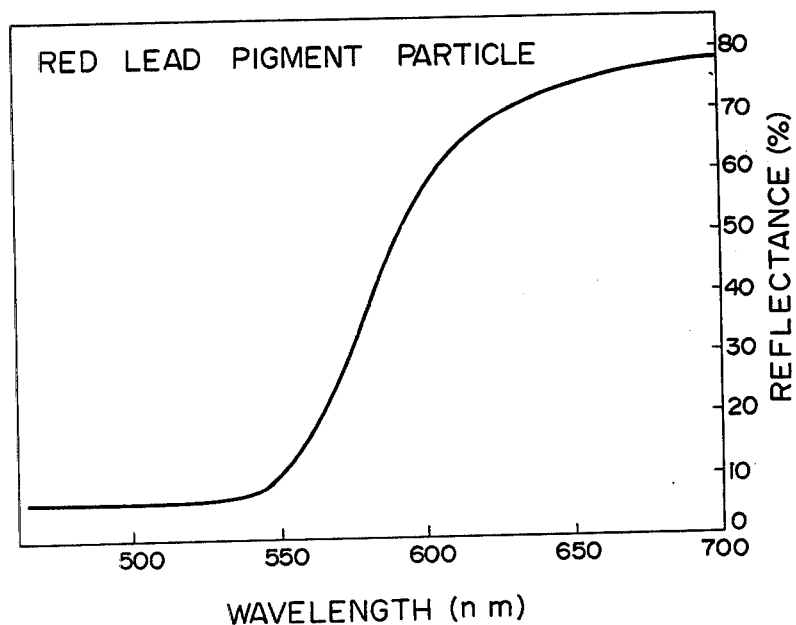
Figure 5C:
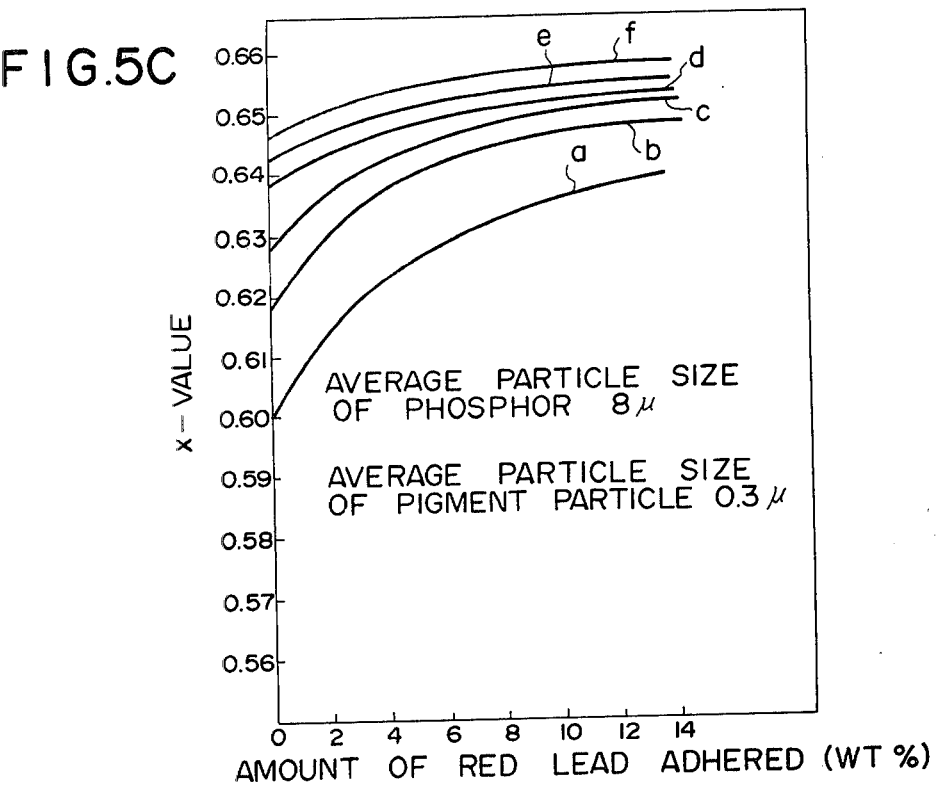
FIGS. 5-(A), (B) and (C) are graphs showing the relationship between the amount of red colored pigment particles (cadmium sulfoselenide pigment particles, rouge pigment particles or red lead pigment particles) adhered to the $Y_2O_2S$:Eu phosphor and the x values at the color points of the respective pigment coated phosphors; in each of the graphs, curves a, b, c, d, e and f indicate the cases wherein the Eu activator values are 0.03 gram atom, 0.04 gram atom, 0.05 gram atom, 0.06 gram atom, 0.066 gram atom and 0.07 gram atom, respectively, per 1 mol of $Y_2O_2S$.

FIGS. 4-(A), (B) and (C) are respectively illustrations of the reflection spectra of cadmium sulfoselenide pigment particles, rouge pigment particles and red lead pigment particles employed in the pigment coated phosphors of the present invention. In FIG. 4, the reflectance on the ordinate is expressed as a relative value with respect to the reflectance of a magnesium oxide diffusion plate taken as 100%. The present inventors have found that when cadmium sulfoselenide pigment particles, rouge pigment particles or red lead pigment particles having the reflection spectra as shown in FIG. 4 are adhered to $Y_2O_2S:Eu$ phosphors, the emission colors of the so obtained pigment coated phosphors are of longer wavelength then the emission color of the same $Y_2O_2S:Eu$ phosphor having no red colored pigment particles adhered thereto. FIGS. 5-(A), (B) and (C) are graphs showing the relationships between (a) the amount of red colored pigment particles (cadmium sulfoselenide pigment particles, rouge pigment particles or red lead pigment particles) adhered to each of several kinds of $Y_2O_2S:Eu$ phosphors, wherein the Eu activator values are varied and (b) the x values at the color point for emission of the respective pigment coated phosphors. In each graph, curves a, b, c, d, e and f indicate the cases wherein the Eu activator values are 0.03 gram atom, 0.04 gram atom, 0.05 gram atom, 0.06 gram atom, 0.066 gram atom and 0.07 gram atom, per 1 mol of $Y_2O_2S$, respectively. It can be seen from FIG. 5 that at all Eu activator values, the x values of the emission color points of the pigment coated phosphor are larger than the x values of the $Y_2O_2S:Eu$ phosphor per se, regardless of the kind of red colored pigment particle. That is, it is found that at all Eu activator values, the emission colors of the pigment coated phosphors are of longer wavelength than the emission color of the $Y_2O_2S:Eu$ phosphor per se, regardless of the kind of red colored pigment particle used. In addition, it can be seen from FIG. 5 that, regardless of the red colored pigment particles used, the emission colors of the pigment coated phosphors obtained are shifted to the longer wavelength side as the amount of the red colored pigment particles adhered is increased. Furthermore, it can be seen from curve f in FIG. 5 that when the pigment coated phosphor is prepared by adhering an appropriate amount of cadmium sulfoselenide, rouge or red lead particles to a $Y_2O_2S$:Eu phosphor having a good emission color as a red emitting phosphor for a color television cathode ray tube, the emission colors of the so obtained pigment coated phosphors are shifted to the longer wavelength side, resulting in emission colors unsuitable for red emitting phosphors to be used in color television cathode ray tubes; and further from curves b, c, d and e in FIG. 5 that when the pigment coated phosphors are prepared by adhering a suitable amount of cadmium sulfoselenide, rouge or red lead particles to $Y_2O_2S$:Eu phosphors which are unsuitable as red emitting phosphors for color television cathode ray tubes, the emission colors obtained of the so prepared pigment coated phosphors are shifted to the longer wavelength side, resulting in suitable emission colors suitable for red emitting phosphors to be used in color television cathode ray tubes.

Figure 6A:
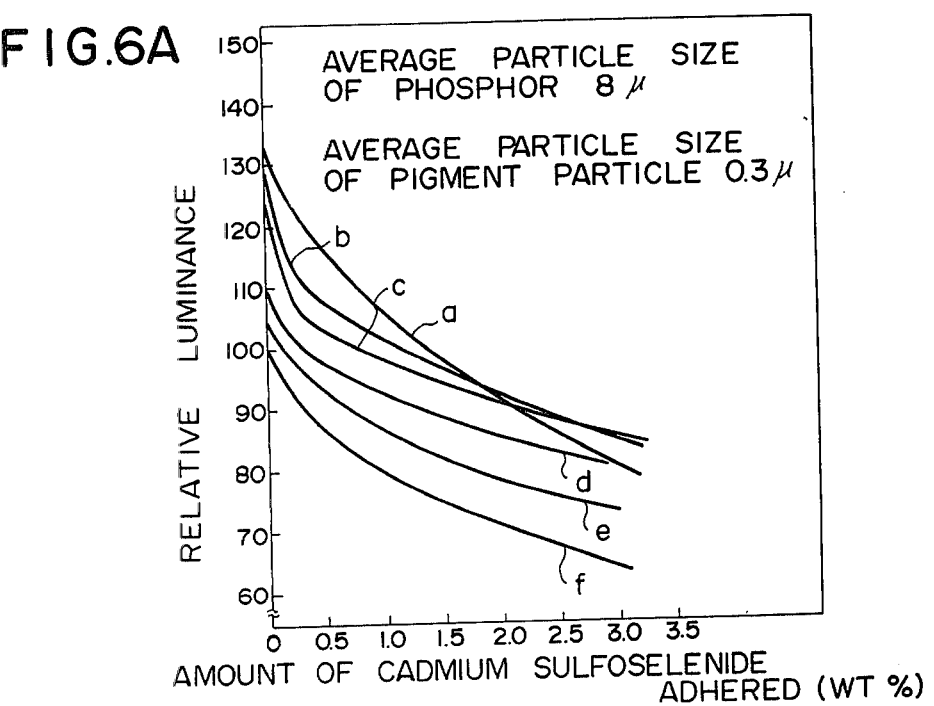
FIGS. 6-(A), (B) and (C) are graphs showing the relationship between the amount of red colored pigment particles (cadmium sulfoselenide pigment particles, rouge pigment particles or red lead pigment particles) adhered to the $Y_2O_2S$:Eu phosphor and the emission luminance of the pigment coated phosphors; in each graph, curves a, b, c, d, e and f represent the cases wherein the Eu activator values are 0.03 gram atom, 0.04 gram atom, 0.05 gram atom, 0.06 gram atom, 0.066 gram atom and 0.07 gram atom, respectively, per 1 mol of $Y_2O_2S$.
Figure 6B:
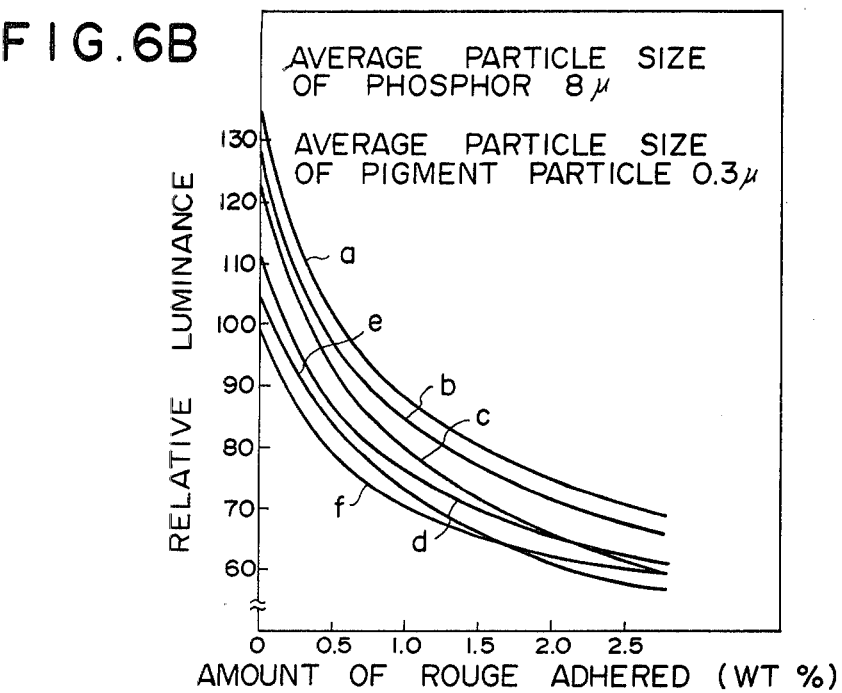
Figure 6C:
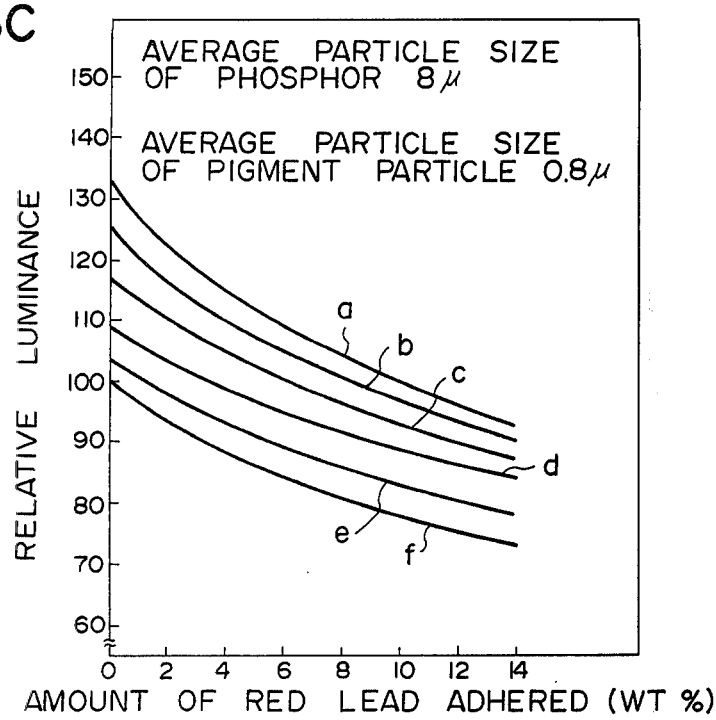

FIGS. 6-(A), (B) and (C) are graphs showing the relationships between (a) amount of red colored pigment particles (cadmium sulfoselenide pigment particles, rouge pigment particles or red lead pigment particles) adhered to each of several kinds of $Y_2O_2S$:Eu phosphors, wherein the Eu activator values are varied, and (b) the emission luminance of the pigment coated phosphors. In each graph, curves, a, b, c, d, e and f represent the cases in which the Eu activator values are 0.03 gram atom, 0.04 gram atom, 0.05 gram atom, 0.06 gram atom, 0.066 gram atom and 0.07 gram atom, respectively, per 1 mol of $Y_2O_2S$. In all of the graphs, the emission luminance on the ordinate is expressed as a relative value with respect to the emission luminance of a $Y_2O_2S$:Eu phosphor having an Eu activator value of 0.07 gram atom per 1 mol of $Y_2O_2S$ taken as 100. As stated before, a $Y_2O_2S$:Eu phosphor with a lower Eu activator value generally provides higher emission luminance regardless of the kind of red colored pigment particles adhered thereto insofar as the amount of said red pigment particles is the same. Accordingly, pigment coated phosphors having higher emission luminance are obtained in the case of employing the $Y_2O_2S$:Eu phosphors (curves a, b, c, d and e) having smaller Eu activator values than in the $Y_2O_2S$:Eu phosphor (curve f) which has been used as a red emitting phosphor in cathode ray tubes for conventional color television.

Figure 7A:
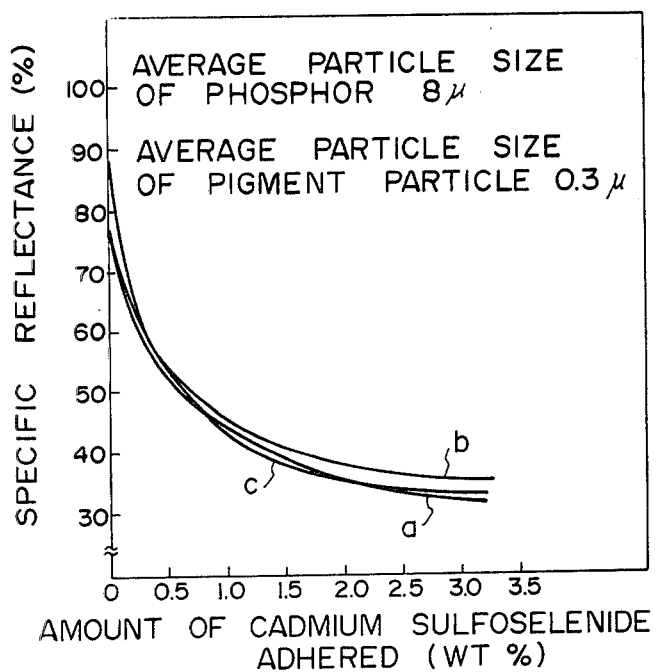
FIGS. 7-(A), (B) and (C) are graphs showing the relationship between the amount of red colored pigment particles (cadmium sulfoselenide pigment particles, rouge pigment particles or red lead pigment particles) adhered to the $Y_2O_2S$:Eu phosphor and the specific reflectance of the pigment coated phosphors; in each of the graphs, curves a, b and c represent the cases wherein the Eu activator values are 0.04 gram atom, 0.05 gram atom and 0.06 gram atom, respectively, per 1 mol of $Y_2O_2S$.
Figure 7B:
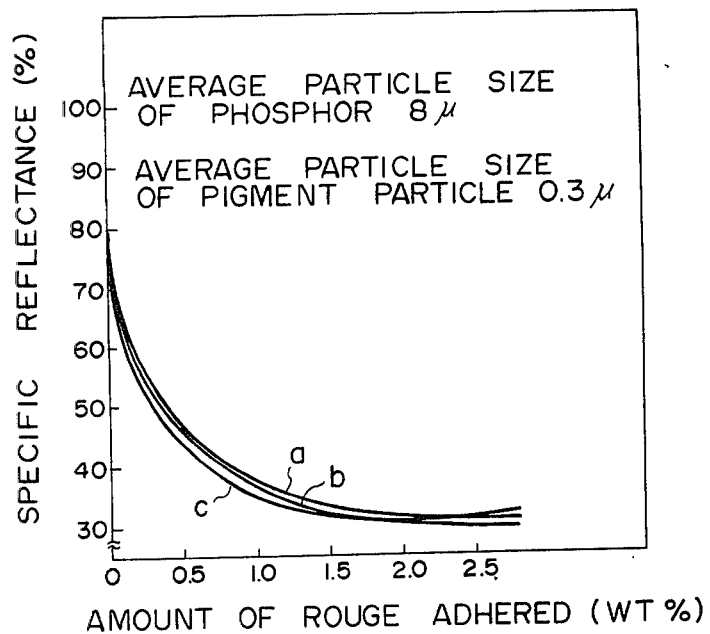
Figure 7C:
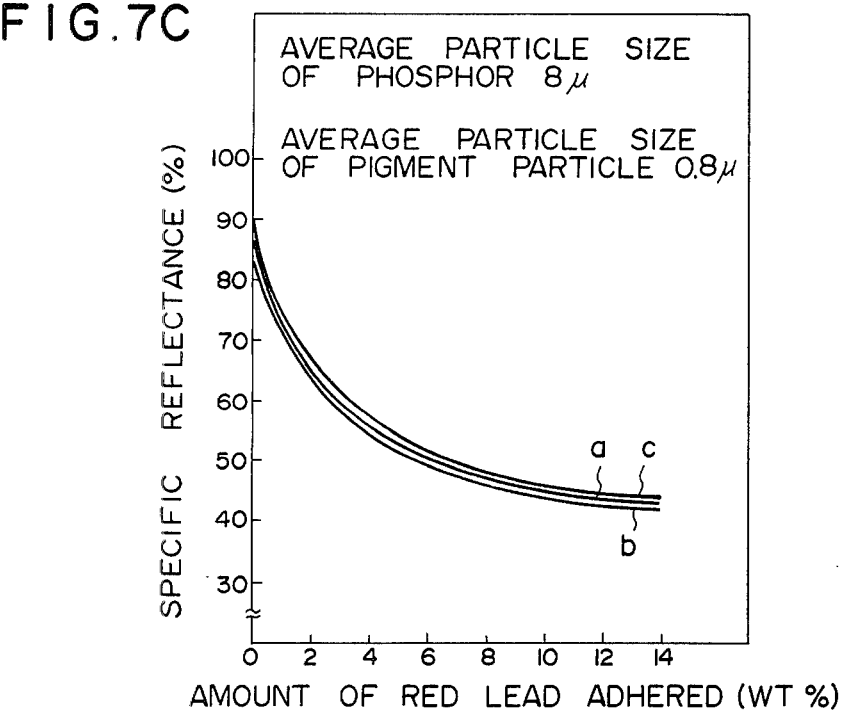

FIGS. 7-(A), (B) and (C) are graphs demonstrating the relationships between (a) the amount of red colored pigment particles (cadmium sulfoselenide pigment particles, rouge pigment particles or red lead pigment particles) adhered to each of several kinds of $Y_2O_2S$:Eu phosphors, wherein the Eu activator values are varied, and (b) the specific reflectance of the pigment coated phosphors. In the respective graphs, curves a, b and c represent the cases wherein the Eu activator values are 0.04 gram atom, 0.05 gram atom and 0.06 gram atom, respectively, per 1 mol of $Y_2O_2S$. As is clear from FIG. 7, the specific reflectance decreases naturally with increased amounts of adhered red colored pigment particles regardless of the kind of red colored pigment particles used, but the relationship between the amount of red colored pigment particles adhered and the specific reflectance is almost the same for all Eu activator values of the phosphor.

As is clear from FIGS. 5, 6 and 7 described above, in the red pigment coated red emitting phosphors using $Y_2O_2S$:Eu phosphors as the red emitting phosphors and cadmium sulfoselenide, rouge or red lead as the red colored pigment particles, the Eu activator value of the $Y_2O_2S$:Eu phosphor affects the emission luminance and the emission color and the amount of red colored pigment particles adhered affects all three factors: reflectance, emission luminance and emission color. Thus, as a $Y_2O_2S$:Eu phosphor having suitable reflectance, emission luminance and emission color as a red pigment coated red emitting phosphor for a cathode ray tube for color television, there can be used the pigment coated phosphor obtained by using a phosphor which has a lower Eu activator value than the $Y_2O_2S$:Eu phosphor employed as a red emitting phosphor in conventional color television cathode ray tubes and which has an Eu activator value in a range of 0.04 gram atom to 0.066 gram atom per 1 mol of $Y_2O_2S$ and by adhering to the surface of this $Y_2O_2S$:Eu phosphor, 0.1 to 2.0 wt % of cadmium sulfoselenide pigment particles, 0.05 to 2.0 wt % of rouge pigment particles or 0.1 to 12 wt % of red lead pigment particles. When the amount of red colored pigment particles is within the range defined for each type of pigment particle, good results in terms of emission luminance can be obtained by making the Eu activator value smaller than 0.04 gram atom, but this improvement in emission luminance will be accompanied by an undesirable shift in emission color to the shorter wavelength side; if the actuator value exceeds 0.066 gram atom, there is the undesirable result that emission luminance is markedly decreased and emission color shifts toward the longer wavelength side. In addition, in the aforementioned ranges of the Eu activator value, if the amounts of adhered cadmium sulfoselenide pigment particles, rouge pigment particles and red lead pigment particles are lower than 0.1 wt%, 0.05 wt % and 0.1 wt %, respectively, emission luminance is good but a desirable reflectance is not obtained and emission colors also become of short wavelength; if the amounts exceed 2.0 wt %, 2.0 wt % and 12 wt %, respectively, good reflectance is obtained but emission luminance is degraded and emission colors shift to the longer wavelength side. The especially preferred range of the Eu activator value is from 0.044 gram atom to 0.06 gram atom in the case of using any of the red colored pigment particles. Especially preferred ranges for the amounts of adhered cadmium sulfoselenide pigment particles, rouge pigment particles and red lead pigment particles are 0.3 wt % to 1.0 wt %, 0.1 wt % to 1.0 wt % and 2 wt % to 10 wt %, respectively.

Similarly to the $Y_2O_2S$:Eu phosphor employed as a red emitting phosphor in conventional color television cathode ray tubes, the $Y_2O_2S$:Eu phosphor employed in the pigment coated phosphor of the present invention has an average particle size of $3\mu$ to $15\mu$, preferably $4\mu$ to $12\mu$. On the other hand, the cadmium sulfoselenide pigment particles, rouge pigment particles and red lead pigment particles which are employed in the pigment coated phosphor in accordance with the present invention have an average particle size of $0.1\mu$ to $1.0\mu$ in the case of the cadmium sulfoselenide pigment particles and rouge pigment particles, and $0.1\mu$ to $1.5\mu$ in the case of the red lead pigment particles; more preferably $0.2\mu$ to $0.5\mu$ in the case of the cadmium sulfoselenide pigment particles and rouge pigment particles, and $0.2\mu$ to $1.0\mu$ in the case of the red lead pigment particles. The amount of red colored pigment particles adhered varies depending upon the particle size of the $Y_2O_2S$:Eu phosphor and the particle size of the red colored pigment particles; but by carefully selecting the average particle size of the Y$_2$O$_2$S:Eu phosphor and the red colored pigment particles employed, a pigment coated phosphor having good characteristics can be obtained insofar as the amount of pigment particles adhered is within the aforementioned ranges.

As a method for preparing the pigment coated phosphor of the present invention by adhering cadmium sulfoselenide pigment particles, rouge pigment particles or red lead pigment particles to the surface of Y$_2$O$_2$S:Eu phosphor particles, conventional methods for preparing pigment coated phosphors such as recited in U.S. Pat. No. 3,886,394 as mentioned hereinabove may be adopted. In U.S. Pat. No. 3,886,394, pigment particles dispersed in an appropriate solution of a water soluble resin such as polyvinyl pyrrolidone, etc. are mixed with a phosphor dispersed in an aqueous solution of gelatin, then the resulting mixture is stirred and then the precipitates formed are dried to obtain the pigment coated phosphor. However, upon the preparation of the pigment coated phosphor, it is important that the pigment particles be uniformly and strongly adhered to the surface of the phosphor. Desired methods for uniformly and strongly adhering the pigment partices to the surface of the phosphor include methods utilizing an electrostatic coupling method, a suspension polymerization method, or a copolymerization method, and a method for production thereof using a mixture of gelatin and gum arabic as an adhesive, and the like.

The pigment coated phosphor in accordance with the present invention exhibits excellent reflectance, emission luminance and emission color as a red emitting phosphor used in a cathode ray tube for color television. In addition, the pigment coated phosphor in accordance with the present invention can be produced inexpensively since the Y$_2$O$_2$S:Eu phosphor having a lower Eu activator value than the Y$_2$O$_2$S:Eu phosphor used in conventional color television cathode ray tube is employed.

Next, the cathode ray tube for a high contrast color television in accordance with the present invention will be described in greater detail. As the red emitting phosphor of the phosphor layer of the cathode ray tube for high contrast color television in accordance with the present invention, there is employed at least one of the three kinds of pigment coated phosphors of the present invention described hereinabove. As explained before, the pigment coated phosphors of the present invention have an excellent combination of reflectance, emission luminance and emission color and hence, the cathode ray tube for high contrast color television in accordance with the present invention using the pigment coated phosphors of the present invention as red emitting phosphors is excellent in contrast, red luminance and red chromaticity. In addition, the fact that the red luminance is high naturally indicates that the white luminance is also high.

It is preferable that ordinary green-emitting phosphors, and not pigment coated phosphors, be employed as the green-emitting phosphors for the high contrast color television cathode ray tube of the present invention. This is because in the case of using the pigment coated green-emitting phosphors the decrease in green luminance is accelerated markedly more rapidly than the decrease in specific reflectance. It is preferable to use as green-emitting phosphors of the cathode ray tube of the present invention at least one selected from a copper and aluminum activated zinc sulfide (ZnS:Cu,Al) phosphor, a copper activated zinc sulfide (ZnS:Cu) phosphor, a copper and aluminum activated zinc cadmium sulfide [(Zn,Cd)S:Cu,Al] phosphor wherein the cadmium sulfide content is 1 to 15 wt% based on the host material, a copper activated zinc cadmium sulfide [(Zn,Cd)S:Cu] phosphor wherein the cadmium sulfide content is 0.1 to 10 wt % based on the host material, a gold, copper and aluminum activated zinc sulfide (ZnS:Au,Cu,Al) phosphor and a silver activated zinc cadmium sulfide [(Zn,Cd)S:Ag] phosphor wherein the cadmium sulfide content is 30 to 50 wt % based on the host material. The above mentioned ZnS:Cu phosphor and (Zn,Cd)S:Cu phosphor may contain a trace of halogen, and the ZnS:Au,Cu,Al phosphor may contain traces of halogen or bismuth and/or antimony. The preferred ranges of cadmium sulfide content of the above described (Zn,Cd)S:Cu,Al phosphor, (Zn,Cd)S:Cu phosphor and (Zn,Cd)S:Ag phosphor are 3 to 10 wt %; 1 to 8 wt % and 33 to 42 wt %, respectively. Preferable and especially preferable amounts of activators in each of the above six kinds of green-emitting phosphors are shown in Table 5 below. In Table 5, all of the activator values are expressed in grams per 1 g of the host material.

TABLE 5

| Green-Emitting Phosphor | Activator | Preferable Activator Value | More Preferable Activator Value |
|---|---|---|---|
| ZnS:Cu,Al phosphor | Cu | $8\times10^{-6}$–$10^{-3}$ | $2\times10^{-5}$–$5\times10^{-4}$ |
| | Al | $8\times10^{-6}$–$4\times10^{-3}$ | $2\times10^{-5}$–$2\times10^{-3}$ |
| ZnS:Cu phosphor | Cu | $10^{-5}$–$10^{-3}$ | $5\times10^{-5}$–$5\times10^{-4}$ |
| (Zn,Cd)S:Cu,Al phosphor | Cu | $10^{-5}$–$5\times10^{-4}$ | $3\times10^{-5}$–$10^{-4}$ |
| | Al | $2.5\times10^{-6}$–$2.5\times10^{-3}$ | $10^{-5}$–$5\times10^{-4}$ |
| (Zn,Cd)S:Cu phosphor | Cu | $10^{-5}$–$5\times10^{-4}$ | $3\times10^{-5}$–$10^{-4}$ |
| ZnS:Au,Cu,Al phosphor | Au | $10^{-5}$–$4\times10^{-3}$ | $10^{-4}$–$2\times10^{-3}$ |
| | Cu | $10^{-5}$–$10^{-3}$ | $5\times10^{-5}$–$5\times10^{-4}$ |
| | Al | 1 to 10 times as large as the amount of (Au + Cu) | |
| (Zn,Cd)S:Ag phosphor | Ag | $10^{-5}$–$5\times10^{-4}$ | $3\times10^{-5}$–$2\times10^{-4}$ |

On the other hand, it is preferable that blue emitting phosphors for the high contrast color television cathode ray tube of the present invention be employed in the form of pigment coated phosphors as in the case of the red emitting phosphors. It is particularly advisable to use at least one selected from a pigment coated phosphor which is a silver activated zinc sulfide (ZnS:Ag) phosphor having cobalt blue pigment particles and/or ultrasonic pigment particles adhered to the surface thereof and a pigment coated phosphor which is a silver and aluminum activated zinc sulfide (ZnS:Ag,Al) phosphor having cobalt blue pigment particles and/or ultramarine pigment particles adhered to the surface thereof. The ZnS:Ag phosphor described above may contain a trace of halogen. Preferable and more preferable values of the activators for the ZnS:Ag phosphor and ZnS:Ag,Al phosphor used in the pigment coated phosphors are shown in Table 6 below. In Table 6, the activator values are expressed in grams per 1 g of the host material. In the case of both the ZnS:Ag phosphor and the ZnS:Ag,Al phosphor, the preferable amount of adhered blue colored pigment particles is 0.1 to 10 wt %, most preferably 0.5 to 5 wt %, based on the phosphor.

TABLE 6

| Blue-Emitting Phosphor | Activator | Preferable Activator Value | More Preferable Activator Value |
|---|---|---|---|
| ZnS:Ag | Ag | $10^{-5}$–$10^{-3}$ | $8\times10^{-5}$–$5\times10^{-4}$ |

TABLE 6-continued

| Blue-Emitting Phosphor | Activator | Preferable Activator Value | More Preferable Activator Value |
|---|---|---|---|
| Phosphor ZnS:Ag,Al phosphor | Ag Al | $10^{-5}$–$3\times10^{-3}$ $2.5\times10^{-6}$–$1.5\times10^{-2}$ | $5\times10^{-5}$–$8\times10^{-4}$ $10^{-5}$–$4\times10^{-3}$ |

The present invention will be explained in more detail with reference to the examples below.

EXAMPLE 1

In water at 40° C. was dissolved 0.6 weight parts of gelatin to prepare a 0.3% aqueous solution of gelatin. To the 0.3% aqueous solution of gelatin were added 100 weight parts of a $Y_2O_2S$:Eu phosphor having an Eu activator value of 0.05 gram atom/mol and an average particle size of $8\mu$. The mixture was sufficiently uniformly dispersed using a stirrer until primary particles were formed. Thus, a dispersion of the phosphor was obtained. The $Y_2O_2S$:Eu phosphor described above had the emission color point E' (x=0.628, y=0.357) shown in FIG. 8-(A), and the specific reflectance and emission luminance thereof were as shown in Table 7 below.

Separately, 0.4 weight parts of gum arabic was dissolved in water to prepare a 0.3% aqueous solution of gum arabic. To the 0.3% aqueous gum arabic solution was added 1 weight parts of cadmium sulfoselenide pigment particles ("#7300" made by Mitsubishi Metal Mining Co., Ltd.) having an average particle size of $0.3\mu$. The mixture was sufficiently uniformly dispersed with a stirrer until primary particles were formed. Thus, a dispersion of the pigment particles was obtained.

Then, the so obtained phosphor dispersion was mixed with the pigment particle dispersion with stirring. The pH of the mixture was adjusted to 4. After cooling to lower than 10° C., 1 weight parts of formalin was slowly added to the mixture. The mixture was allowed to stand and then the resulting supernatant was removed by decantation. After the precipitates were washed with water, the precipitates were separated and concentrated using a continuous decanter to obtain a pigment coated phosphor cake containing about 85% of solid components. The cake was dried in a stream of air to yield a pigment coated phosphor whose coating of cadmium sulfoselenide pigment particles amounted ot 1 wt %. The thus obtained pigment coated phosphor possessed excellent reflectance, emission luminance as well as emission color when used as a red emitting phosphor employed in a cathode ray tube for high contrast color television. The pigment coated phosphor had the color point E for emission (x=0.646, y=0.346) shown in FIG. 8-(A), and the reflectance and emission luminance thereof were as shown in Table 7 below.

As is shown in Table 7, the white luminance of a high contrast color television cathode ray tube using the pigment coated phosphor as a red emitting phosphor was excellent.

EXAMPLE 2

Figure 8A:
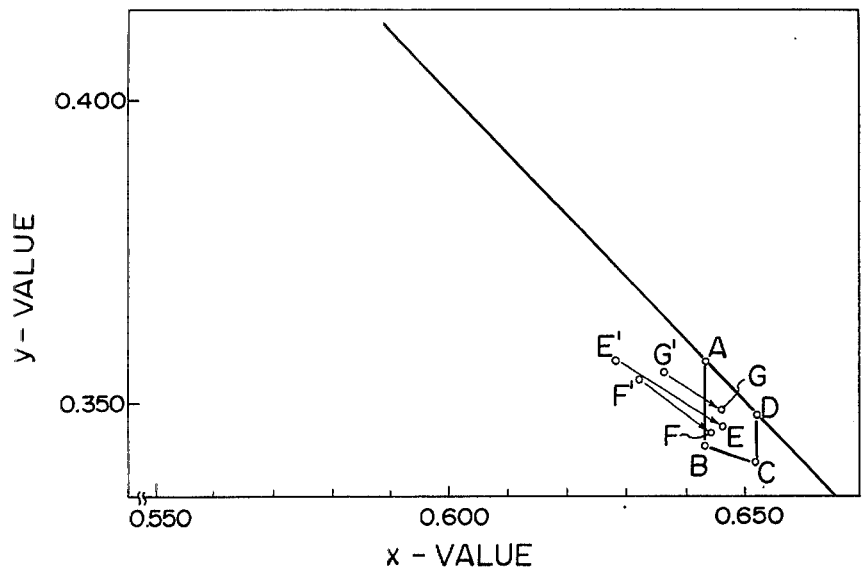
FIGS. 8-(A), (B) and (C) show the color point region required for a $Y_2O_2S$:Eu phosphor employed in a color television cathode ray tube, the color point region of the $Y_2O_2S$:Eu phosphor and the color point region of the pigment coated phosphor in accordance with the present invention, respectively, on the coordinates of the Standard Chromaticity Diagram System CIE.
Figure 8B:
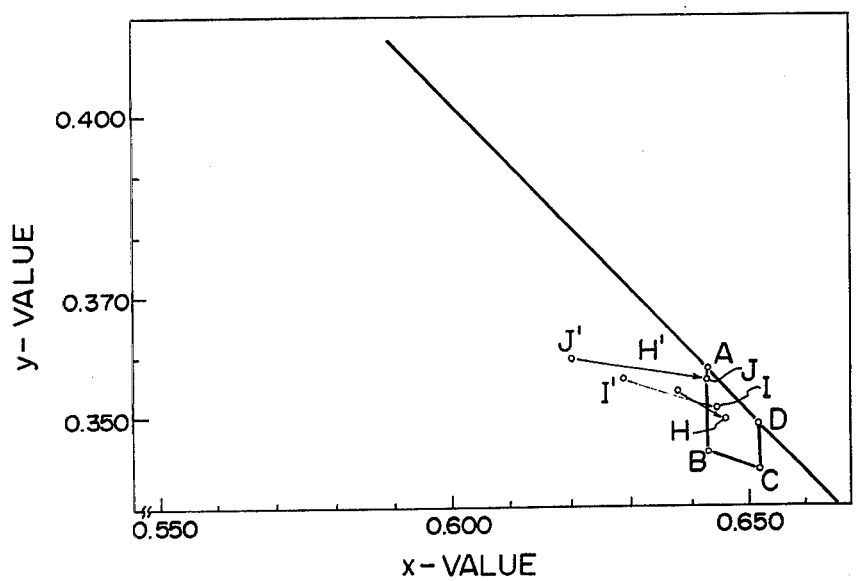
Figure 8C:
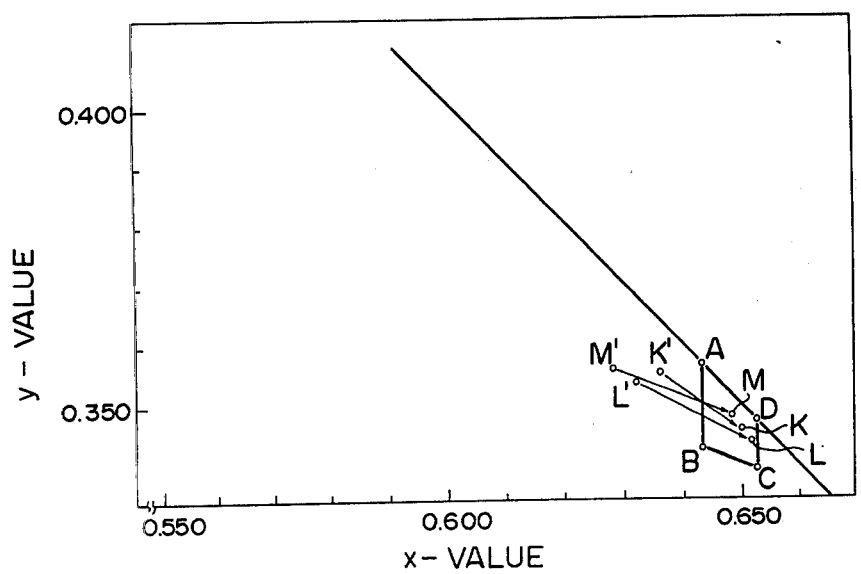

A pigment coated phosphor having 0.4 wt % of cadmium sulfoselenide pigment particles adhered thereto was prepared in a manner similar to Example 1 except that 100 weight parts of a $Y_2O_2S$:Eu phosphor having an Eu activator value of 0.056 gram atom/mol, an average particle size of $10\mu$ and an emission color point at color point F' (x=0.632, y=0.354) shown in FIG. 8-(A) was used together with 0.4 parts of cadmium sulfoselenide pigment particles ("#7300" made by Mitsubishi Metal Mining Co., Ltd.) having an average particle size of $0.3\mu$.

The thus obtained pigment coated phosphor exhibited excellent reflectance, emission luminance as well as emission color as a red emitting phosphor in a cathode ray tube for high contrast color television. The emission color point of the pigment coated phosphor was color point F (x=0.644, y=.345) shown in FIG. 8-(A), and the reflectance and emission luminance were as shown in Table 7 below.

As is shown in Table 7, the white luminance of a high contrast color television cathode ray tube using the pigment coated phosphor as a red emitting phosphor was excellent.

EXAMPLE 3

A pigment coated phosphor having 0.7 wt % of cadmium sulfoselenide pigment particles adhered thereto was prepared in a manner similar to Example 1 except that 100 weight parts of a $Y_2O_2S$:Eu phosphor having an Eu activator value of 0.06 gram atom/mol, an average particle size of $9\mu$ and an emission color point at color point G' (x=0.636, y=0.355) shown in FIG. 8-(A) was used together with 0.7 weight parts of cadmium sulfoselenide pigment particles ("#7300" made by Mitsubishi Metal Mining Co., Ltd.) having an average particle size of $0.4\mu$.

The thus obtained pigment coated phosphor exhibited excellent reflectance, emission luminance as well as emission color as a red emitting phosphor in a cathode ray tube for high contrast color television. The emission color point of the pigment coated phosphor was color point G (x=0.646, y=0.349) shown in FIG. 8-(A), and the reflectance and emission luminance were as shown in Table 7 below.

As is shown in Table 7, the white luminance of a high contrast color television cathode ray tube using the pigment coated phosphor as a red emitting phosphor was excellent.

EXAMPLE 4

A pigment coated phosphor having 0.3 wt % of rouge pigment particles adhered thereto was prepared in a manner similar to Example 1 except that 100 weight parts of a $Y_2O_2S$:Eu phosphor having an Eu activator value of 0.06 gram atom/mol, an average particle size of $7.4\mu$ and an emission color point at color point H' (x=0.636, y=0.355) shown in FIG. 8-(B) was used together with 0.3 weight parts of rouge pigment particles ("Tenyo #502" made by Tone Sangyo Co., Ltd.) having an average particle size of $0.3\mu$.

The thus obtained pigment coated phosphor exhibited excellent reflectance, emission luminance as well as emission color as a red emitting phosphor in a cathode ray tube for high contrast color television. The emission color point of the pigment coated phosphor was color point H (x=0.646, y=0.349) shown in FIG. 8-(B), and the reflectance and emission luminance were as shown in Table 7 below.

As is shown in Table 7, the white luminance of a high contrast color television cathode ray tube using the pigment coated phosphor as a red emitting phosphor was excellent.

EXAMPLE 5

A pigment coated phosphor having 0.7 wt% of rouge pigment particles adhered thereto was prepared in a manner similar to Example 1 except that 100 weight parts of a $Y_2O_2S$:Eu phosphor having an Eu activator value of 0.05 gram atom/mol, an average particle size of 9.1μ and an emission color point at color point I' (x=0.628, y=0.357) shown in FIG. 8-(B) was used together with 0.7 weight parts of rouge pigment particles ("Tenyo #502" made by Tone Sangyo Co., Ltd.) having an average particle size of 0.3μ.

The thus obtained pigment coated phosphor exhibited excellent reflectance, emission luminance as well as emission color as a red emitting phosphor in a cathode ray tube for high contrast color television. The emission color point of the pigment coated phosphor was color point I (x=0.645, y=0.350) shown in FIG. 8-(B), and the reflectance and emission luminance were as shown in Table 7 below.

As is shown in Table 7, the white luminance of a high contrast color television cathode ray tube using the pigment coated phosphor as a red emitting phosphor was excellent.

EXAMPLE 6

A pigment coated phosphor having 0.9 wt % of rouge pigment particles adhered thereto was prepared in a manner similar to Example 1 except that 100 weight parts of a $Y_2O_2S$:Eu phosphor having an Eu activator value of 0.044 gram atom/mol, an average particle size of 10μ and an emission color point at color point J' (x=0.620, y=0.359) shown in FIG. 8-(B) was used together with 0.9 weight parts of rouge pigment particles ("Tenyo #502" made by Tone Sangyo Co., Ltd.) having an average particle size of 0.4μ.

The thus obtained pigment coated phosphor exhibited excellent reflectance, emission luminance as well as emission color as a red emitting phosphor in a cathode ray tube for high contrast color television. The emission color point of the pigment coated phosphor was color point J (x=0.643, y=0.355) shown in FIG. 8-(B), and the reflectance and emission luminance were as shown in Table 7 below.

As is shown in Table 7, the white luminance of a high contrast color television cathode ray tube using the pigment coated phosphor as a red emitting phosphor was excellent.

EXAMPLE 7

A pigment coated phosphor having 6 wt % of red lead pigment particles adhered thereto was prepared in a manner similar to Example 1 except that 100 weight parts of a $Y_2O_2S$:Eu phosphor having an Eu activator value of 0.06 gram atom/mol, an average particle size of 8μ and an emission color point at color point K' (x=0.636, y=0.355) shown in FIG. 8-(C) was used together with 6 weight parts of red lead pigment particles ("Special Red Lead" made by Naoshima Kasei Co., Ltd.) having an average particle size of 0.8μ.

The thus obtained pigment coated phosphor exhibited excellent reflectance, emission luminance as well as emission color as a red emitting phosphor in a cathode ray tube for high contrast color television. The emission color point of the pigment coated phosphor was color point K (x=0.650, y=0.346) shown in FIG. 8-(C), and the reflectance and emission luminance were as shown in Table 7 below.

As is shown in Table 7, the white luminance of a high contrast color television cathode ray tube using the pigment coated phosphor as a red emitting phosphor was excellent.

EXAMPLE 8

A pigment coated phosphor having 5 wt % of red lead pigment particles adhered thereto was prepared in a manner similar to Example 1 except that 100 weight parts of a $Y_2O_2S$:Eu phosphor having an Eu activator value of 0.056 gram atom/mol, an average particle size of 10μ and an emission color point at color point L' (x=0.632, y=0.354) shown in FIG. 8-(C) was used together with 5 weight parts of red lead pigment particles ("Special Red Lead" made by Naoshima Kasei Co., Ltd.) having an average particle size of 0.8μ.

The thus obtained pigment coated phosphor exhibited excellent reflectance, emission luminance as well as emission color as a red emitting phosphor in a cathode ray tube for high contrast color television. The emission color point of the pigment coated phosphor was color point L (x=0.652, y=0.344) shown in FIG. 8-(C), and the reflectance and emission luminance were as shown in Table 7 below.

As is shown in Table 7, the white luminance of a high contrast color television cathode ray tube using the pigment coated phosphor as a red emitting phosphor was excellent.

EXAMPLE 9

A pigment coated phosphor having 8 wt % of red lead pigment particles adhered thereto was prepared in a manner similar to Example 1 except that 100 weight parts of a $Y_2O_2S$:Eu phosphor having an Eu activator value of 0.05 gram atom/mol, an average particle size of 7μ and an emission color point at color point M' (x=0.628, y=0.357) shown in FIG. 8-(C) was used together with 8 weight parts of red lead pigment particles ("Special Red Lead" made by Naoshima Kasei Co., Ltd.) having an average particle size of 0.8μ.

The thus obtained pigment coated phosphor exhibited excellent reflectance, emission luminance as well as emission color as a red emitting phosphor in a cathode ray tube for high contrast color television. The emission color point of the pigment coated phosphor was color point M (x=0.648, y=0.348) shown in FIG. 8-(C), and the reflectance and emission luminance were as shown in Table 7 below.

As is shown in Table 7, the white luminance of a high contrast color television cathode ray tube using the pigment coated phosphor as a red emitting phosphor was excellent.

TABLE 7

| Example No. | Amount of Red Pigment Adhered (wt %) | Specific Reflectance (%) | Emission Luminance (%) | Emission Color Point | White Luminance (%) |
|---|---|---|---|---|---|
| 1 | 0 | 87.0 | 118 | (x=0.628, y=0.357) | — |
|   | 1 | 47.5 | 98 | (x=0.646, y=0.346) | 99 |
| 2 | 0 | 87.5 | 116 | (x=0.632, y=0.354) | — |
|   | 0.4 | 55.0 | 103 | (x=0.644, y=0.345) | 101 |
| 3 | 0 | 89.1 | 109 | (x=0.636, y=0.355) | — |
|   | 0.7 | 48.4 | 91 | (x=0.646, y=0.349) | 96 |

TABLE 7-continued

| Example No. | Amount of Red Pigment Adhered (wt %) | Specific Reflectance (%) | Emission Luminance (%) | Emission Color Point | White Luminance (%) |
|---|---|---|---|---|---|
| 4 | 0 | 89.1 | 109 | (x=0.636, y=0.355) | — |
|   | 0.3 | 51.0 | 94 | (x=0.646, y=0.349) | 97 |
| 5 | 0 | 87.0 | 118 | (x=0.628, y = 357) | — |
|   | 0.7 | 37.5 | 82 | (x=0.645, y=0.350) | 92 |
| 6 | 0 | 86.0 | 121 | (x=0.620, y=0.359) | — |
|   | 0.9 | 38.0 | 83 | (x=0.643, y=0.355) | 93 |
| 7 | 0 | 89.1 | 109 | (x=0.636, y=0.355) | — |
|   | 6 | 50.1 | 97 | (x=0.650, y=0.346) | 99 |
| 8 | 0 | 87.5 | 116 | (=0.632, y=0.354) | — |
|   | 5 | 48.5 | 104 | (x=0.652, y=0.344) | 101 |
| 9 | 0 | 87.0 | 118 | (x=0.628, y=0.357) | — |
|   | 8 | 49.3 | 100 | (x=0.648, y=0.348) | 100 |

Notes:
*Emission luminance is expressed as a relative value with respect to the emission luminance of a $Y_2O_2S$:Eu phosphor having an Eu activator value of 0.077 gram atom/mol taken as 100%.
*The light source for measuring specific reflectance was a tungsten lamp.
*White luminance here is the white luminance of a cathode ray tube having a phosphor layer using a ZnS:Cu,Al phosphor as the green-emitting phosphor and a ZnS:Ag phosphor having adhered thereto cobalt blue pigment particles as the blue emitting phosphor, and is expressed as a relative value with respect to the white luminance of a cathode ray tube in which the phosphor layer uses the same phosphor as mentioned above as the green-emitting phosphor and blue emitting phosphor, and uses a $Y_2O_2S$:Eu phosphor having an Eu activator value of 0.07 gram atom/mol as the red emitting phosphor, said latter white luminance being taken as 100%.

We claim:

1. A pigment coated phosphor for a color television cathode ray tube comprising a europium activated yttrium oxysulfide phosphor having a europium activator value in a range of from 0.04 gram atom to 0.066 gram atom per 1 mol of yttrium oxysulfide having adhered to the surface thereof cadmium sulfoselenide pigment particles, the amount of said adhered cadmium sulfoselenide pigment particles being in a range of 0.1 wt % to 2.0 wt % based upon said europium activated yttrium oxysulfide phosphor.

2. A pigment coated phosphor for a color television cathode ray tube as defined in claim 1 wherein the reflectances of said cadmium sulfoselenide pigment particles at wavelengths of no more than 570 nm, 600 nm, 650 nm and 700 nm are no more than 10%, no more than 50%, 55 to 85%, and 60 to 90%, respectively when the reflectance of a magnesium oxide diffusion plate is taken as 100%.

3. A pigment coated phosphor for a color television cathode ray tube as defined in claim 1 wherein said europium activator value is in a range of from 0.044 gram atom to 0.06 gram atom and said amount of the cadmium sulfoselenide pigment particles is in a range of from 0.3 wt % to 1.0 wt %.

4. A pigment coated phosphor for a color television cathode ray tube as defined in claim 1 wherein the average particle size of said europium activated yttrium oxysulfide phosphor ranges from $3\mu$ to $15\mu$ and the average particle size of said cadmium sulfoselenide pigment particles ranges from $0.1\mu$ to $1\mu$.

5. A pigment coated phosphor for a color television cathode ray tube as defined in claim 4 wherein the average particle size of said europium activated yttrium oxysulfide phosphor ranges from $4\mu$ to $12\mu$ and the average particle size of said cadmium oxysulfide pigment particles ranges from $0.2\mu$ to $0.5\mu$.

6. A pigment coated phosphor for a color television cathode ray tube comprising a europium activated yttrium oxysulfide phosphor having a europium activator value in a range of from 0.04 gram atom to 0.066 gram atom per 1 mol of yttrium oxysulfide having adhered to the surface thereof rouge pigment particles, the amount of said adhered rouge pigment particles being in a range of 0.05 wt % to 2.0 wt % based upon said europium activated yttrium oxysulfide phosphor.

7. A pigment coated phosphor for a color television cathode ray tube as defined in claim 6 wherein the reflectances of said rouge pigment particles at wavelengths of not more than 550 nm, 550 nm, 600 nm, 650 nm and 700 nm are no more than 10%, 5 to 15%, 10 to 30%, 13 to 40% and 18 to 50% when the reflectance of a magnesium oxide diffusion plate is taken as 100%.

8. A pigment coated phosphor for a color television cathode ray tube as defined in claim 6 wherein said europium activator value is in a range of 0.044 gram atom to 0.06 gram atom and said amount of the rouge pigment particles is in a range of 0.1 wt % to 1.0 wt %.

9. A pigment coated phosphor for a color television cathode ray tube as defined in claim 6 wherein the average particle size of said europium activated yttrium oxysulfide phosphor ranges from $3\mu$ to $15\mu$ and the average particle size of said rouge pigment particles ranges from $0.1\mu$ to $1\mu$.

10. A pigment coated phosphor for a color television cathode ray tube as defined in claim 9 wherein the average particle size of said europium activated yttrium oxysulfide phosphor ranges from $4\mu$ to $12\mu$ and the average particle size of said rouge pigment particles ranges from $0.2\mu$ to $0.5\mu$.

11. A pigment coated phosphor for a color television cathode ray tube comprising a europium activated yttrium oxysulfide phosphor having a europium activator value in a range of from 0.04 gram atom to 0.066 gram atom per 1 mol of yttrium oxysulfide having adhered to the surface thereof red lead pigment particles, the amount of said adhered red lead pigment particles being in a range of 0.1 wt % to 12 wt % based upon said europium activated yttrium oxysulfide phosphor.

12. A pigment coated phosphor for a color television cathode ray tube as defined in claim 11 wherein the reflectances of said red lead pigment particles at wavelengths of not more than 500 nm, 500 nm, 550 nm, 600 nm, 650 nm and 700 nm are no more than 10%, 5 to 10%, 10 to 15%, 55 to 75%, 70 to 90% and 75 to 95% when the reflectance of a magnesium oxide diffusion plate is taken as 100%.

13. A pigment coated phosphor for a color television cathode ray tube as defined in claim 11 wherein said europium activator value is in a range of 0.044 gram atom to 0.06 gram atom and said amount of the red lead pigment particles is in a range of 2.0 wt % to 10 wt %.

14. A pigment coated phosphor for a color television cathode ray tube as defined in claim 11 wherein the average particle size of said europium activated yttrium oxysulfide phosphor ranges from $3\mu$ to $15\mu$ and the average particle size of said red lead pigment particles ranges from $0.1\mu$ to $1.5\mu$.

15. A pigment coated phosphor for a color television cathode ray tube as defined in claim 14 wherein the average particle size of said europium activated yttrium oxysulfide phosphor ranges from 4μ to 12μ and the average particle size of said red lead pigment particles ranges from 0.2μ to 1.0μ.

16. A cathode ray tube for high contrast color television using as a red emitting phosphor at least one selected from (1) a pigment coated phosphor comprising a europium activated yttrium oxysulfide phosphor having a europium activator value in a range of from 0.04 gram atom to 0.066 gram atom per 1 mol of yttrium oxysulfide having adhered to the surface thereof cadmium sulfoselenide pigment particles, the amount of said cadmium sulfoselenide pigment particles adhered thereto being in a range of 0.1 wt % to 2.0 wt % based on said europium activated yttrium oxysulfide phosphor, (2) a pigment coated phosphor comprising the same europium activated yttrium oxysulfide phosphor having adhered to the surface thereof rouge pigment particles, the amount of said rouge pigment particles adhered thereto being in a range of 0.05 wt % to 2.0 wt % based on said europium activated yttrium oxysulfide phosphor, and (3) a pigment coated phosphor comprising the same europium activated yttrium oxysulfide phosphor having adhered to the surface thereof red lead pigment particles, the amount of said red lead pigment particles adhered thereto being in a range of 0.1 wt % to 12 wt % based on said europium activated yttrium oxysulfide phosphor.

17. A cathode ray tube for high contrast color television as defined in claim 16 wherein at least one selected from a copper and aluminum activated zinc sulfide phosphor, a copper activated zinc sulfide phosphor, a copper and aluminum activated zinc cadmium sulfide phosphor wherein the cadmium sulfide content is 1 to 15 wt % based on the host material, a copper activated zinc cadmium sulfide phosphor wherein the cadmium sulfide content is 0.1 to 10 wt % based on the host material, a gold, copper and aluminum activated zinc sulfide phosphor and a silver activated zinc cadmium sulfide phosphor wherein the cadmium sulfide content is 30 to 50 wt % based on the host material is employed as a green-emitting phosphor; and at least one selected from a pigment coated phosphor comprising a silver activated zinc sulfide phosphor having adhered to the surface thereof cobalt blue pigment particles and/or marine blue pigment particles and a pigment coated phosphor comprising a silver and aluminum activated zinc sulfide having adhered to the surface thereof cobalt blue pigment particles and/or marine blue pigment particles is employed as a blue emitting phosphor.

* * * * *

UNITED STATES PATENT AND TRADEMARK OFFICE
CERTIFICATE OF CORRECTION

PATENT NO. : B1 4,307,320
DATED : December 28, 1993
INVENTOR(S) : Kotera, et. al.

It is certified that error appears in the above-indentified patent and that said Letters Patent is hereby corrected as shown below:

On column 2, line 1, in claim 7 after "550nm, 600nm," insert -- 650nm, -- thereof.

On column 2, line 13, in claim 16 delete "sulfoselemide" and insert in place thereof -- sulfoselenide --.

On column 2, line 14, in claim 16 delete "1.0 wt %" and insert in place thereof -- 0.1 wt % --.

On column 2, line 40, in claim 18 delete "x value" and insert in place thereof -- x-value --.

Signed and Sealed this

Thirtieth Day of August, 1994

Attest:

BRUCE LEHMAN

*Attesting Officer*     *Commissioner of Patents and Trademarks*

REEXAMINATION CERTIFICATE (2163rd)

United States Patent [19]

Kotera et al.

[11] B1 4,307,320

[45] Certificate Issued   Dec. 28, 1993

[54] PIGMENT COATED PHOSPHOR AND HIGH CONTRAST COLOR TELEVISION CATHODE RAY TUBE USING SAME

[75] Inventors: Noboru Kotera; Thihiro Yoshida, both of Hatano; Toshiaki Hatsumi; Kazuhito Iwasaki, both of Odawara; Isao Iwamoto, Hiratsuka; Katuzo Kanda, Oiso; Seiji Murakami; Shusaku Eguchi, both of Minami-ashigara, all of Japan

[73] Assignee: Kasei Optonix, Ltd., Tokyo, Japan

Reexamination Requests:
No. 90/002,238, Dec. 21, 1990
No. 90/002,460, Sep. 6, 1991

Reexamination Certificate for:
Patent No.: 4,307,320
Issued: Dec. 22, 1981
Appl. No.: 50,064
Filed: Jun. 19, 1979

Related U.S. Application Data

[63] Continuation of Ser. No. 874,829, Feb. 3, 1978, abandoned.

[51] Int. Cl.$^5$ ............................................... H01J 29/10

[52] U.S. Cl. ................................. 313/474; 427/215; 427/68; 252/301.45

[56] References Cited

U.S. PATENT DOCUMENTS

| | | | |
|---|---|---|---|
| 3,308,326 | 3/1967 | Kaplan | 427/68 |
| 3,418,246 | 12/1968 | Royce | 252/301.4 |
| 3,423,621 | 1/1969 | Royce | 427/68 |
| 3,812,394 | 5/1974 | Kaplan | 427/68 |

OTHER PUBLICATIONS

J. W. Haynes et al., *J. Electrochem. Soc.:* Solid State Science, pp. 1060–1066 (1968).
S. S. Trond, *RCA Engineer,* 25-2 (Aug./Sep. 1979).

*Primary Examiner*—Sam Silverberg

[57] ABSTRACT

Pigment coated phosphors comprising a europium activated yttrium oxysulfide phosphor having a europium activator value within a range of 0.04 gram atom to 0.066 gram atom per 1 mol of yttrium oxysulfide having adhered thereto red colored pigment particles such as cadmium sulfoselenide pigment particles, rouge pigment particles or red lead pigment particles, in respective amounts of 0.1 to 2.0 wt %, 0.05 to 2.0 wt % or 0.1 to 12 wt %, based upon the europium activated yttrium oxysulfide phosphor; and a cathode ray tube for high contrast color television using as a red emitting phosphor at least one of the three pigment coated phosphors.

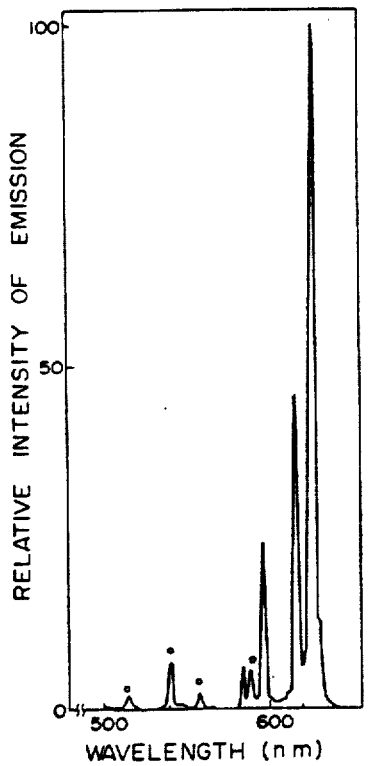

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-5 and 11-15 are cancelled.

Claims 6, 7, and 16 are determined to be patentable as amended.

Claims 8-10 and 17, dependent on an amended claim, are determined to be patentable.

New claim 18 is added and determined to be patentable.

6. A pigment coated phosphor for a color television cathode ray tube comprising a europium activated yttrium oxysulfide phosphor having a europium activator value in a range of from 0.04 gram atom to 0.066 gram atom per 1 mol of yttrium oxysulfide having adhered to the surface thereof rouge pigment particles, the amount of said adhered rouge pigment particles being in a range of 0.05 wt % to 2.0 wt % based upon said europium activated yttrium oxysulfide phosphor, *wherein the pigment coated phosphor has an emission color point with an x-value of about 0.630 to about 0.652.*

7. A pigment coated phosphor for a color television cathode ray tube as defined in claim 6 wherein the reflectances of said rouge pigment particles at wavelengths of [not more] *less* than 550 nm, *and wavelengths of 550 nm, 600 nm, and 700 nm are no more than 10%, 5 to 15%, 10 to 30%, 13 to 40% and 18 to 50% when the reflectance of a magnesium oxide diffusion plate is taken as 100%.*

16. A cathode ray tube for high contrast color television using as a red emitting phosphor [at least one selected from (1)] a pigment coated phosphor comprising a europium activated yttrium oxysulfide phosphor having an europium activator value in a range of from 0.04 gram atom to 0.066 gram atom per 1 mol of yttrium oxysulfide having adhered to the surface thereof [cadmium sulfoselenide pigment particles, the amount of said cadmium sulfoselemide pigment particles adhered thereto being in a range of 1.0 wt % to 2.0 wt % based on said europium activated yttrium oxysulfide phosphor, (2) a pigment coated phosphor comprising the same europium activated yttrium oxysulfide phosphor having adhered to the surface thereof] rouge pigment particles, the amount of said rouge pigment particles adhered thereto being in a range of 0.05 wt % to 2.0 wt % based on said europium activated yttrium oxysulfide phosphor[, and (3) a pigment coated phosphor comprising the same europium activated yttrium oxysulfide phosphor having adhered to the surface thereof red lead pigment particles, the amount of said red lead pigment particles adhered thereto being in a range of 0.1 wt % to 12 wt % based on said europium activated yttrium oxysulfide phosphor], *wherein the pigment coated phosphor has an emission color point with an x-value of about 0.630 to about 0.652.*

*18. A pigment coated phosphor for a color television cathode ray tube comprising a europium activated yttrium oxysulfide phosphor having a europium activator value in a range of from 0.04 gram atom to 0.066 gram atom per 1 mol of yttrium oxysulfide having adhered to the surface thereof rouge pigment particles, the amount of said adhered rouge pigment particles being in a range of 0.05 wt % to 2.0 wt % based upon said europium activated yttrium oxysulfide phosphor, wherein the pigment coated phosphor has an emission color point with an x value of about 0.643 to about 0.652.*

* * * * *